US010783457B2

(12) United States Patent
Yang et al.

(10) Patent No.: US 10,783,457 B2
(45) Date of Patent: Sep. 22, 2020

(54) METHOD FOR DETERMINING RISK PREFERENCE OF USER, INFORMATION RECOMMENDATION METHOD, AND APPARATUS

(71) Applicant: ALIBABA GROUP HOLDING LIMITED, Grand Cayman (KY)

(72) Inventors: Fan Yang, Hangzhou (CN); Xin Fu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/691,161

(22) Filed: Nov. 21, 2019

(65) Prior Publication Data

US 2020/0090077 A1  Mar. 19, 2020

Related U.S. Application Data

(63) Continuation of application No. PCT/CN2018/088194, filed on May 24, 2018.

(30) Foreign Application Priority Data

May 26, 2017  (CN) .......................... 2017 1 0385292

(51) Int. Cl.
  *G06N 20/00*    (2019.01)
  *G06Q 30/02*    (2012.01)
(52) U.S. Cl.
  CPC ............. *G06N 20/00* (2019.01); *G06Q 30/02* (2013.01)
(58) Field of Classification Search
  CPC .... G06Q 40/00; G06Q 40/025; G06Q 30/018; G06Q 10/0635; A63F 13/75
  See application file for complete search history.

(56) References Cited

U.S. PATENT DOCUMENTS 6,021,397 A    2/2000  Jones et al.
6,430,542 B1   8/2002  Moran
(Continued)

FOREIGN PATENT DOCUMENTS

CN    101493913 A1    7/2009
CN    101685526 A     3/2010
(Continued)

OTHER PUBLICATIONS

Chalidabhongse et al. "A personalized stock recommendation system using adaptive user modeling." 2006 International Symposium on Communications and Information Technologies. IEEE, 2006: 463-468 (Year: 2006).*

(Continued)

*Primary Examiner* — Kamran Afshar
*Assistant Examiner* — Randall K. Baldwin (57) ABSTRACT

Methods, systems, and apparatus, including computer programs encoded on computer storage media, for determining risk preference are provided. One of the methods includes: obtaining user data generated during a risk-related transaction of a user; determining a characteristic value of the user under each variable in a plurality of variables according to the user data, the plurality of variables comprising at least one variable affecting a risk preference of the user; and inputting the characteristic value of the user under each variable into a risk preference model to determine an output of the risk preference model as a risk preference index indicating a level of the risk preference of the user.

18 Claims, 3 Drawing Sheets

(56) References Cited

U.S. PATENT DOCUMENTS

| | | | |
|---|---|---|---|
| 6,983,266 | B1 | 1/2006 | Goldschmidt |
| 7,016,873 | B1 | 3/2006 | Peterson et al. |
| 8,144,619 | B2 | 3/2012 | Hoffberg |
| 8,200,527 | B1 | 6/2012 | Thompson et al. |
| 8,306,908 | B1 | 11/2012 | Barker et al. |
| 8,429,051 | B1 | 4/2013 | Samson |
| 8,494,946 | B2 | 7/2013 | Lortscher, Jr. |
| 8,498,913 | B2 | 7/2013 | Jenson et al. |
| 8,768,810 | B2 | 7/2014 | Infanger |
| 9,721,296 | B1* | 8/2017 | Chrapko .............. G06Q 30/018 |
| 10,121,115 | B2* | 11/2018 | Chrapko ............ G06Q 10/0635 |
| 10,242,019 | B1 | 3/2019 | Shan et al. |
| 10,357,713 | B1* | 7/2019 | Landers .................. A63F 13/75 |
| 10,366,378 | B1 | 7/2019 | Han et al. |
| 2002/0069079 | A1 | 6/2002 | Vega |
| 2002/0138386 | A1 | 9/2002 | Maggioncalda et al. |
| 2003/0065241 | A1 | 4/2003 | Hohnloser |
| 2003/0088489 | A1* | 5/2003 | Peters .................... G06Q 40/06 705/36 R |
| 2004/0019560 | A1 | 1/2004 | Evans et al. |
| 2004/0088247 | A1 | 5/2004 | Grant et al. |
| 2004/0098328 | A1 | 5/2004 | Grant et al. |
| 2005/0131752 | A1 | 6/2005 | Gracie et al. |
| 2006/0020531 | A1 | 1/2006 | Veeneman et al. |
| 2007/0011071 | A1 | 1/2007 | Cuscovitch et al. |
| 2007/0016542 | A1 | 1/2007 | Rosauer et al. |
| 2007/0255638 | A1 | 11/2007 | Chen et al. |
| 2007/0271166 | A1 | 11/2007 | Boone et al. |
| 2008/0040250 | A1 | 2/2008 | Salter |
| 2009/0018969 | A1* | 1/2009 | Ayres .................... G06Q 40/00 705/36 R |
| 2009/0125427 | A1 | 5/2009 | Atwood et al. |
| 2009/0276374 | A1 | 11/2009 | Viner |
| 2009/0313041 | A1 | 12/2009 | Eder |
| 2011/0046970 | A1 | 2/2011 | Fontenot |
| 2011/0153520 | A1 | 6/2011 | Jeng et al. |
| 2011/0161110 | A1 | 6/2011 | Mault |
| 2011/0166987 | A1 | 7/2011 | Hu et al. |
| 2011/0251978 | A1 | 10/2011 | Davies et al. |
| 2012/0278258 | A1 | 11/2012 | Ayal |
| 2013/0138555 | A1 | 5/2013 | Shishkov |
| 2013/0185189 | A1 | 7/2013 | Stewart |
| 2014/0142988 | A1 | 5/2014 | Grosso et al. |
| 2014/0195412 | A1 | 7/2014 | Metz et al. |
| 2014/0214440 | A1 | 7/2014 | Young et al. |
| 2014/0244476 | A1 | 8/2014 | Shvarts et al. |
| 2014/0279693 | A1 | 9/2014 | Roy et al. |
| 2014/0365355 | A1 | 12/2014 | Shvarts |
| 2015/0026039 | A1 | 1/2015 | Annappindi |
| 2015/0095150 | A1 | 4/2015 | Globe et al. |
| 2015/0161733 | A1 | 6/2015 | Emsbo-Mattingly et al. |
| 2015/0161738 | A1* | 6/2015 | Stempora ............... G06Q 40/08 705/4 |
| 2015/0227868 | A1 | 8/2015 | Saraf et al. |
| 2015/0227869 | A1 | 8/2015 | Saraf et al. |
| 2015/0295808 | A1 | 10/2015 | O'Malley et al. |
| 2015/0363703 | A1* | 12/2015 | Amid ...................... G06F 17/11 706/46 |
| 2016/0019668 | A1 | 1/2016 | Kilinski |
| 2016/0110813 | A1 | 4/2016 | Hayden |
| 2016/0247232 | A1 | 8/2016 | Agarwal et al. |
| 2016/0267595 | A1 | 9/2016 | Rauls et al. |
| 2017/0024821 | A1 | 1/2017 | Sherman |
| 2017/0039324 | A1 | 2/2017 | Francois et al. |
| 2017/0193514 | A1 | 7/2017 | Chen |
| 2017/0200220 | A1 | 7/2017 | Nicholson et al. |
| 2017/0221083 | A1 | 8/2017 | Gerken, III et al. |
| 2017/0293873 | A1* | 10/2017 | Chrapko .............. G06Q 40/025 |
| 2019/0213660 | A1 | 7/2019 | Astrada et al. |

FOREIGN PATENT DOCUMENTS

| | | | |
|---|---|---|---|
| CN | 102117469 | A | 7/2011 |
| CN | 103208081 | A | 7/2013 |
| CN | 104318268 | A | 1/2015 |
| CN | 105303445 | A | 2/2016 |
| CN | 105843909 | A | 8/2016 |
| CN | 105930983 | A | 9/2016 |
| CN | 106022924 | A | 10/2016 |
| CN | 106056241 | A1 | 10/2016 |
| CN | 106056407 | A | 10/2016 |
| CN | 106127576 | A | 11/2016 |
| CN | 106469376 | A1 | 3/2017 |
| CN | 106485585 | A | 3/2017 |
| CN | 106503562 | A | 3/2017 |
| CN | 106875206 | A | 6/2017 |
| CN | 107203939 | A | 9/2017 |
| CN | 107403381 | A | 11/2017 |
| CN | 107437198 | A1 | 12/2017 |
| TW | I578252 | B | 4/2017 |
| TW | I584215 | B | 5/2017 |
| WO | 9222036 | A1 | 12/1992 |
| WO | 9618162 | A1 | 6/1996 |
| WO | 9630850 | A1 | 10/1996 |
| WO | 0205153 | A2 | 1/2002 |
| WO | 2004055621 | A2 | 7/2004 |
| WO | 2008138134 | A1 | 11/2008 |
| WO | 2010003137 | A1 | 1/2010 |
| WO | 2012128776 | A1 | 9/2012 |
| WO | WO-2012128776 | A1 * | 9/2012 .............. G06Q 40/06 |
| WO | 2016042398 | A1 | 3/2016 |

OTHER PUBLICATIONS

First Search and First Office Action for Taiwanese Application No. 107109024, dated May 13, 2019, 11 pages.

Written Opinion of the International Searching Authority and International Search Report for International Application No. PCT/CN2018/088192, dated Aug. 24, 2018, 14 pages.

First Office Action for Chinese Application No. 201710385292.9, dated Nov. 5, 2019, 4 pages.

First Office Action for Taiwanese Application No. 107109028, dated Apr. 23, 2019, 3 pages.

Decision to Reject for Taiwanese Application No. 10709028, dated Aug. 13, 2019, 4 pages.

Written Opinion of the International Searching Authority and International Search Report for International Application No. PCT/CN2018/088194, dated Aug. 29, 2018, 14 pages.

International Preliminary Report on Patentability for International Application No. PCT/2018/088192, dated Dec. 5, 2019, 10 pages.

International Preliminary Report on Patentability for International Application No. PCT/CN2018/088194, dated Dec. 5, 2019, 11 pages.

First Search and First Office Action for Taiwanese Application No. 107109027, dated May 23, 2019, 11 pages.

Decision to Reject for Taiwanese Application No. 107109027, dated Sep. 26, 2019, 8 pages.

Written Opinion of the International Searching Authority and International Search report for International Application No. PCT/CN2018/088191, 14 pages.

International Preliminary Report on Patentability for International Application No. PCT/CN2018/088191, dated Dec. 12, 2019, 11 pages.

Non-Final Office Action for U.S. Appl. No. 16/692,153 dated Jan. 31, 2020.

Non-Final Office Action for U.S. Appl. No. 16/690,949 dated Jan. 21, 2020.

Second Office Action for Chinese Application No. 201710385586.1 dated Feb. 26, 2020 (12 pages).

First Search for Chinese Application No. 201710387851.X dated Nov. 13, 2019 (1 page).

First Office Action for Chinese Application No. 201710385586.1 dated Jan. 2, 2020 (11 pages).

Final Office Action for U.S. Appl. No. 16/690,949 dated Mar. 20, 2020.

Second Office Action for Chinese Application No. 201710385292.9 dated Apr. 14, 2020.

(56) References Cited

OTHER PUBLICATIONS

Second Office Action for Chinese Application No. 201710387851.X dated Apr. 24, 2020.
First Search for Chinese Application No. 201710385292.9 dated Apr. 4, 2020.

* cited by examiner

METHOD FOR DETERMINING RISK
PREFERENCE OF USER, INFORMATION
RECOMMENDATION METHOD, AND
APPARATUS

CROSS REFERENCE TO RELATED
APPLICATIONS

The present application is a continuation application of the International Patent Application No. PCT/CN2018/088194, filed on May 24, 2018, and titled "METHOD FOR DETERMINING RISK PREFERENCE OF USER, INFORMATION RECOMMENDATION METHOD, AND APPARATUS," which claims priority to Chinese Patent Application No. 201710385292.9 filed on May 26, 2017. The entire contents of all of the above applications are incorporated herein by reference in their entirety.

TECHNICAL FIELD

This specification relates to the field of big data technologies, and in particular, to a method for determining risk preference, an information recommendation method, and an apparatus.

BACKGROUND

With the development of the Internet, many transactions can be implemented through Internet platforms. During the operation of some transactions, it is necessary to obtain indices that can reflect the levels of risk preferences of users, and support the operation of the transactions by using the indices. For example, suitable Internet financing products are recommended according to a level of a risk preference of a user, or whether an Internet financing product is suitable for a user is evaluated before the user purchases the product, and the like.

Currently, Internet platforms generally require users to fill in questionnaires with contents related to risk preferences, to determine risk preferences of the users. However, the manner of questionnaire survey is low in efficiency, and cannot ensure that the contents filled in by the users match with their actual situations. Consequently, the risk preference of each user cannot be determined accurately.

SUMMARY

This specification provides a method for determining risk preference, an information recommendation method, and an apparatus. To achieve the foregoing objectives, the specification provides the following technical solutions.

According to a first aspect of this specification, a method for determining risk preference is provided, including: obtaining user data generated during a risk-related transaction of a user; determining a characteristic value of the user under each variable in a plurality of variables according to the user data, the plurality of variables comprising at least one variable affecting a risk preference of the user; and inputting the characteristic value of the user under each variable into a risk preference model to determine an output of the risk preference model as a risk preference index indicating a level of the risk preference of the user.

In some embodiments, before inputting the characteristic value of the user under each variable into a risk preference model, the method further comprises training the risk preference model. Training the risk preference model comprises: selecting a plurality of sample users, the plurality of sample users comprising a plurality of sample users of a high risk preference type and a plurality of sample users of a low risk preference type; obtaining a characteristic value of each sample user in the plurality of sample users under each variable in the plurality of variables; and training the risk preference model according to the obtained characteristic values and the risk preference type corresponding to each sample user, an input of the risk preference model being the characteristic value under the each variable in the plurality of variables, and the output of the risk preference model being a possibility that the user is classified into the high risk preference type.

In some embodiments, the selecting a plurality of sample users comprises: based on a high risk preference rule and a low risk preference rule, determining users whose user data conforms to the high risk preference rule as sample users of the high risk preference type, and determining users whose user data conforms to the low risk preference rule as sample users of the low risk preference type; and/or based on an experimental application for testing risk preferences of users as well as a high risk preference rule and a low risk preference rule, determining users whose behaviors in the experimental application conform to the high risk preference rule as sample users of the high risk preference type, and determining users whose behaviors in the experimental application conform to the low risk preference rule as sample users of the low risk preference type.

In some embodiments, before determining the characteristic value of the user under the each variable in the plurality of variables according to the user data, the method further comprises determining the each variable affecting the risk preference of the user. Determining the each variable affecting the risk preference of the user comprises: selecting a plurality of sample users, the plurality of sample users comprising a plurality of sample users of a high risk preference type and a plurality of sample users of a low risk preference type; for a variable to be verified, obtaining a characteristic value of each sample user in the plurality of sample users under the variable to be verified; and determining that the variable to be verified is the variable affecting the risk preference of the user if the obtained characteristic values conform to a rule.

In some embodiments, the determining that the variable to be verified is the variable affecting the risk preference of the user if the obtained characteristic values conform to a rule comprises: determining, based on the obtained characteristic values, a first characteristic value rule corresponding to the plurality of sample users of the high risk preference type and a second characteristic value rule corresponding to the plurality of sample users of the low risk preference type; determining a difference between the first characteristic value rule and the second characteristic value rule; and determining that the variable to be verified is the variable affecting the risk preference of the user if the difference conforms to a rule.

In some embodiments, the risk-related transaction comprises a transaction with a capital loss risk, and/or a transaction associated with a risky event.

In some embodiments, the method further comprises recommending, according to the risk preference index of the user, financing product information matching the risk preference index to the user.

In some embodiments, the risk-related transaction comprises an economic life service transaction or a financial transaction.

According to a second aspect of this specification, an information recommendation method is provided, including:

obtaining user data generated during a risk-related transaction of a user; determining a characteristic value of the user under each variable in a plurality of variables according to the user data, the plurality of variables including at least one variable affecting a risk preference of the user; inputting the characteristic value of the user under each variable into a risk preference model to determine an output of the risk preference model as a risk preference index indicating a level of the risk preference of the user; and recommending, according to the risk preference index of the user, financing product information matching the risk preference index to the user.

According to a third aspect of this specification, an apparatus for determining risk preference is provided, including: an obtaining unit, configured to obtain user data generated during a risk-related transaction of a user; a first determining unit, configured to determine a characteristic value of the user under each variable in a plurality of variables according to the user data, the plurality of variables including at least one variable affecting a risk preference of the user; and a second determining unit, configured to input the characteristic value of the user under each variable into a risk preference model, and determine an output of the risk preference model as a risk preference index indicating a level of the risk preference of the user.

According to a fourth aspect of this specification, a computer device is provided, including: a processor; and a memory configured to store instructions executable by the processor; where the processor, when executing the instructions, is configured to: obtain user data generated during a risk-related transaction of a user; determine a characteristic value of the user under each variable in a plurality of variables according to the user data, the plurality of variables including at least one variable affecting a risk preference of the user; and input the characteristic value of the user under each variable into a risk preference model, and determine an output of the risk preference model as a risk preference index indicating a level of the risk preference of the user.

According to a fifth aspect of this specification, a system for determining risk preference comprises one or more processors and one or more non-transitory computer-readable memories coupled to the one or more processors and configured with instructions executable by the one or more processors to cause the system to perform operations comprising: obtaining user data generated during a risk-related transaction of a user; determining a characteristic value of the user under each variable in a plurality of variables according to the user data, the plurality of variables comprising at least one variable affecting a risk preference of the user; and inputting the characteristic value of the user under each variable into a risk preference model to determine an output of the risk preference model as a risk preference index indicating a level of the risk preference of the user.

According to a sixth aspect of this specification, a non-transitory computer-readable storage medium for determining a risk level of a user is configured with instructions executable by one or more processors to cause the one or more processors to perform operations comprising: obtaining user data generated during a risk-related transaction of a user; determining a characteristic value of the user under each variable in a plurality of variables according to the user data, the plurality of variables comprising at least one variable affecting a risk preference of the user; and inputting the characteristic value of the user under each variable into a risk preference model to determine an output of the risk preference model as a risk preference index indicating a level of the risk preference of the user.

It can be learned from the foregoing technical solutions that, user data of a user is obtained, a characteristic value of the user under each variable in a plurality of variables is determined according to the user data, and then a risk preference index of the user is determined by using a preset risk preference model, so as to measure a risk preference of the user according to the risk preference index. Through the foregoing process, highly accurate results can be obtained at a high efficiency.

DETAILED DESCRIPTION

This specification provides a method that can quickly and accurately measure acceptances or preferences of a user with respect to various possible risks. The method can be implemented through big data technologies. In an example of investment risks that a user is faced with during an investment and financing process, a risk acceptance level of the user during investment and financing can be evaluated from two major aspects. One aspect is a subjective risk preference of the user, that is, whether the user prefers or is averse to investment risks, fluctuations, possible losses of the investment, and the like psychologically, and a degree of preference or aversion. The second aspect is an objective risk tolerance level of the user, that is, the measurement of impact from factors, such as investment risks and possible losses of the investment, on actual life of the user, a life goal of the user, or the like. As for subjective risk preferences of users, different users have different risk preferences. Some users prefer purchasing high-risk high-return financing products (such as stocks and funds), and some users prefer purchasing low-risk low-return financing products (for example, third-party current fund financing products such as Yu'E Bao™). To better serve a user, an Internet platform needs to evaluate a subjective risk preference of the user, so as to push suitable financial products to the user according to the risk preference of the user, or evaluate whether a financial product sold to the user is suitable for the user.

Figure 1:
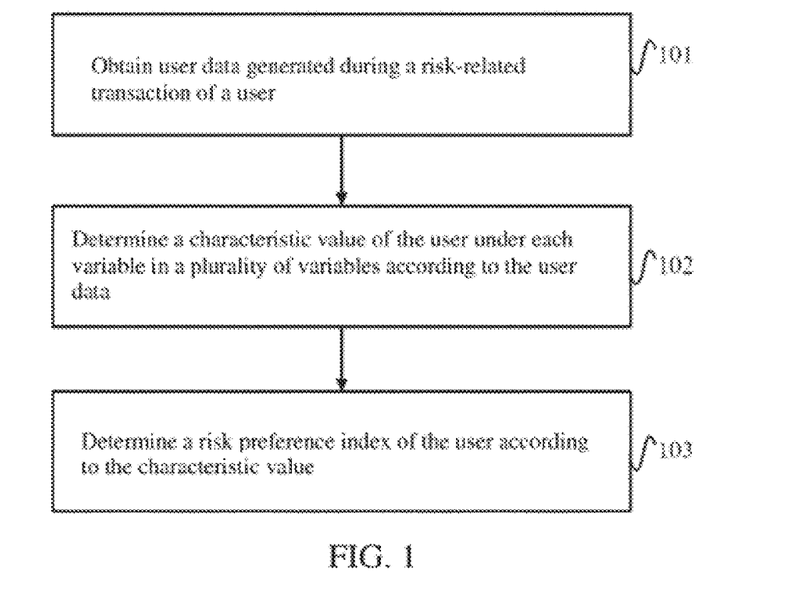
FIG. 1 illustrates a process for determining risk preference according to some embodiments.

FIG. 1 shows a method for determining risk preference according to an example of the embodiments. The method is applicable to a computer device (such as a platform server providing an investment and financing transaction, or a cloud computing platform). As shown in FIG. 1, in some embodiments, the method includes the following steps 101 to 103.

In step 101, user data generated during a risk-related transaction of a user is obtained.

The transaction may be one of various transactions serving users over the Internet, for example, economic life service transactions such as self-service fee payment, and financial transactions such as investment and financing. Generally, APPs providing the transactions can be developed, so that the user participates in these transactions through the APPs. Moreover, multiple risk-related transactions may be provided on the same APP. Such transactions may involve risks, including the following situations: 1) The user may be faced with a risk after participating in the transaction; for example, the user may suffer a capital loss after participating in an investment and financing transaction. 2) A particular event related to the transaction is risky; for example, the user automatically pays a fee through a traffic violation fine payment transaction, an event related to the transaction is a driving event, and the driving event is risky. For another example, the user schedules a physical examination or makes an appointment with a doctor through a medical transaction, and the physical examination event or doctor appointment event also relates to a physical health risk of the user; and the like.

Various user data can be generated when the user operates the various risk-related transactions through the APP. In some embodiments, the user data may be behavior data corresponding to operation behaviors of the user. Using the investment and financing transaction as an example, operation behaviors of the user include, but are not limited to, a behavior of searching for a particular type of information on the APP by the user, a behavior of viewing a particular type of information on the APP by the user, a behavior of commenting on a particular type of information on the APP by the user, and a behavior of purchasing a particular type of financial product on the APP by the user. The operation behaviors of the user may occur at various stages of the investment, for example, before an investment behavior occurs, during the investment, and after the investment behavior is finished. The behavior data may include, but is not limited to, contents viewed by the user, a moment when the viewing action of the user occurs (a start moment or an end moment), a duration of the viewing action, and the like. In some embodiments, the user data may also be data reflected by other events related to the transaction, for example, data related to a driving event of the user (including the number of violations, violation types, and the like), data related to a physical examination event of the user (including a time of the physical examination, contents of the physical examination, and the like). The generated user data may be stored into a database, so that related user data can be obtained when the risk preference of the user needs to be determined.

In step 102, a characteristic value of the user under each variable in a plurality of variables is determined according to the user data.

In some embodiments, the variables include at least one variable affecting a risk preference of the user.

In some embodiments, not all of the user data generated during the risk-related transaction can reflect the risk preference of the user, that is, not all data is associated with the risk preference of the user. In some embodiments, a part of the user data is actually associated with the risk preference of the user, and this part of data is target data that needs to be obtained during the determination of the risk preference of the user. For example, the physical examination event of the user can reflect the attitude of the user when facing a health risk. According to a conventional interpretation, this can reflect the attitude of the user towards other types of risks, and therefore, some data corresponding to the physical examination event may be associated with the risk preference of the user.

Therefore, one or more variables that can affect the risk preference of the user may be set. Using an information search behavior of the user as an example, if most search contents of the user in the APP include terms such as "stocks" or "funds", or the types of financial products searched for by the user are "stocks-type" or "funds-type", it can reflect in a certain degree that the user prefers high risks (that is, the user has a high degree of preference for the investment risk). On the contrary, if frequent search contents of the user are low-risk financial products, it can reflect that the user prefers low risks (that is, the user has a low degree of preference for the investment risk). In this example, variables corresponding to the search behavior are types to which the contents of search belong. Correspondingly, for each content type, a characteristic value (that is, a value assigned to the variable) corresponding to the content type may be predetermined. For example, content types are classified into a high risk type, a medium risk type, and a low risk type, where a characteristic value corresponding to the high risk type is 1, a characteristic value corresponding to the medium risk type is 0.5, and a characteristic value corresponding to the low risk type is 0. Using an information viewing behavior of the user as an example, if a user A needs to view 100 other financial products before purchasing a financial product X, and a user B needs to view 10 other financial products before purchasing a financial product X, it indicates that the user A is more rational about the investment risk, and the user B does not care much about the investment risk. In other words, the risk preference of the user A is lower than the risk preference of the user B. In this example, the variable is the quantity of financial products viewed by the user before an investment behavior occurs. There are various types of variables, which are not listed one by one herein.

In some embodiments, a plurality of candidate variables may be predefined, and it is verified, through related technical means, whether the candidate variables are correlated to the degree of preference of the user for the investment risk one by one. Finally, a variable correlated to the risk preference of the user is selected. A process of how to obtain, through verification, a variable correlated to the risk preference of the user is described in detail below.

The plurality of variables may include some variables that have no influence or small influence on (or a low correlation to) the risk preference of the user. For example, an influence coefficient of such variables may be set to 0 or a value close to 0.

User data generated by operations of the user when using the APP is generally a statistical value. In some optional embodiments, in order to calculate a risk preference index of the user more accurately, a plurality of statistical value intervals may be preset for each variable, and a characteristic value of a target user under each variable may be determined by using the statistical value intervals. By using the quantity of high-risk financial products viewed by the user before investment as an example, three statistical value intervals: 1 to 10, 10 to 20, and 20 to 50, may be defined in advance; besides, it is defined that characteristic values corresponding to the three statistical value intervals are 0.1, 0.2, and 0.3 respectively. Then, when the quantity of high-risk financial products viewed by a user before investment is between 1 and 10, the characteristic value of the variable is 0.1. When the quantity of high-risk financial products viewed by a user before investment is between 10 and 20, the characteristic value of the variable is 0.2. When the quantity of high-risk financial products viewed by a user before investment is between 20 and 50, the characteristic value of the variable is 0.3. Similarly, characteristic values of other types of variables can be determined according to this rule.

In some embodiments, the user may face many types of risks in life (including investment and financing risks and non-investment risks). In order to more accurately determine the risk preference index that can measure a level of the risk preference of the user, behavior data of the user when facing various types of risks needs to be obtained as much as possible, and the level of the risk preference of the user is determined according to choices or operations made by the user when facing various types of risks. For example, the non-investment risks include, but are not limited to, occupational risks of the user, physical health risks of the user, risks when the user takes part in sports, risks when the user drives, risks in other financial scenarios, and the like. When the user faces the occupational risks, the variables may include: whether the user chooses self-employment or works in a highly stable industry such as a bank or government, or a job changing frequency of the user. When the user faces the physical health risks, the variables may include a physical examination frequency or stability of the user, or a health care product purchasing status of the user, and the like. When the user takes part in sports, the variables may include: whether the user likes taking part in high-risk sports, such as climbing and skiing, and whether the user likes taking part in low-risk sports, such as fishing. When the user faces risks during driving, the variables may include: a driving speed of the user, whether the user often drives over the speed limit, or the number of violations, and the like. When the user is in other financial scenarios, the variables may include: whether the user purchases sufficient insurance to prepare for the future, whether the user prefers using a credit card for payment, spending in advance, spending from a deposit card, or the like. User data related to the foregoing types of risks may also be obtained from a backend database corresponding to the APP providing the related transactions.

One or more variables may be designed for other non-investment risks, and it is verified, through related technical means, whether each variable is a variable correlated to the risk preference of the user one by one.

In step 103, a risk preference index of the user is determined according to the characteristic value of the user under each variable, where the risk preference index is used for measuring a level of the risk preference of the user.

In some embodiments, an influence coefficient may be predetermined for each variable. Then, a process of calculating the risk preference index is roughly as follows: first multiplying the characteristic value of each variable by the influence coefficient corresponding to the variable, then adding up all the products, and determining a sum of the products as the risk preference index of the user.

In other embodiments, a risk preference model may be trained in advance. Then, in step 103, the characteristic value of the user under each variable is input into the risk preference model, and an output of the risk preference model is determined as the risk preference index of the user. The input of the risk preference model is the characteristic value under each variable in the plurality of variables, and the output of the risk preference model is a possibility that the user is classified into a high risk preference type. If users with the lowest risk preference are defined as "users of a low risk preference type", and users with the highest risk preference are defined as "users of a high risk preference type", the risk preference index corresponding to the "users of a low risk preference type" is equal to or infinitely close to 0, and the risk preference index corresponding to "users of a high risk preference type" is equal to or infinitely close to 1.

If the risk preference index of a user is closer to 0, it indicates that the user is more likely to belong to the "users of a low risk preference type"; if the risk preference index of a user is closer to 1, it indicates that the user is more likely to belong to the "users of a high risk preference type".

Figure 2:
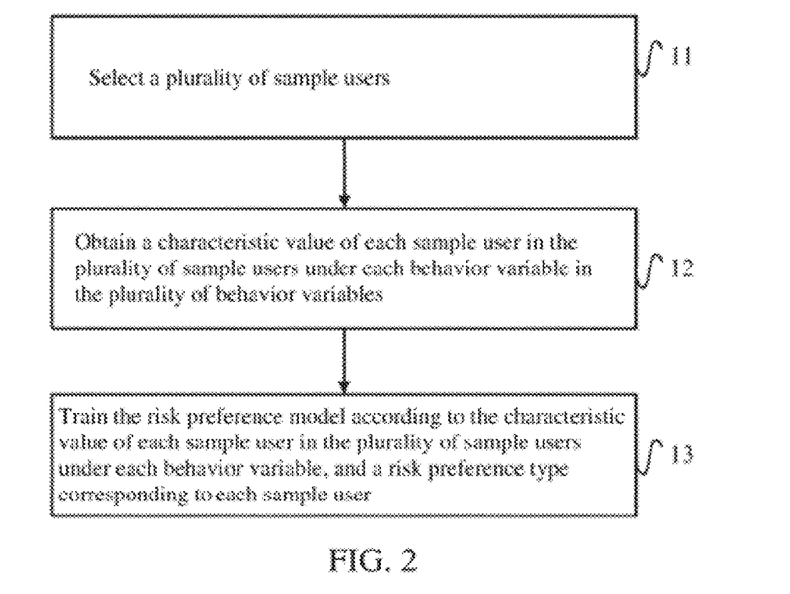
FIG. 2 illustrates a process of training a risk preference model according to some embodiments.

FIG. 2 is a process of training a risk preference model according to some embodiments. As shown in FIG. 2, in some optional embodiments, in order to improve the accuracy, the risk preference model can be trained through the following process.

Step 11: Select a plurality of sample users, the plurality of sample users including a plurality of sample users of a high risk preference type and a plurality of sample users of a low risk preference type.

Sample users belonging to the high risk preference type may not care about or even prefer risks or losses during investment. On the contrary, samples belonging to the low risk preference type may be averse to risks during investment, and avoid losses as far as possible. In one embodiment, the two types of samples are significantly different in terms of behaviors.

The process of selecting a plurality of sample users can be implemented in many feasible manners. Two implementation manners are listed herein.

In some embodiments, step 11 may be implemented through the following process.

Based on a high risk preference rule and a low risk preference rule that are defined, users whose user data conforms to the high risk preference rule are determined as sample users of the high risk preference type, and users whose user data conforms to the low risk preference rule are determined as sample users of the low risk preference type. In some embodiments, the definitions of the rules may not rely on whether a user purchases a high-risk product. The definitions of the related rules herein may be based on related theories in psychology, behavioral finance, and decision science. For example, a risk preference type to which a user belongs may be defined by considering a psychological status and an actual behavior of the user when facing a loss. In this scenario, a defined "high risk preference rule" may be "continuing to purchase regardless of the loss". For example, the user continues to purchase a certain amount of high-risk product when a capital loss percentage is greater than or equal to 20% or a loss amount is greater than or equal to 500 RMB. A defined "low risk preference rule" may be "being afraid of checking after a loss occurs", that is, the user frequently checks a profit status of personal assets when there is a profit in the account, and is afraid of checking the profit status of the personal assets when a significant loss is generated in the account. For another example, a risk preference type to which a user belongs may be defined by considering a psychological status and an actual behavior of the user during fluctuations. In this scenario, a defined "low risk preference rule" may be "being more sensitive during fluctuations", that is, when the stock market is stable, the user does not care about his/her assets, and each time the stock market fluctuates greatly (for example, declines by 1%), the user logs in frequently to check his/her assets. In order to improve the accuracy of the selected sample users, many different "high risk preference rules" and many different "high risk preference rules" may be defined, and various sample users conforming to the rules are selected by using these rules and existing user data, and a "high risk preference" or "low risk preference" type tag is added to each sample user.

In other embodiments, step 11 may be implemented through the following process.

Based on an experimental application for testing risk preferences of users as well as a high risk preference rule and a low risk preference rule that are defined, users whose behaviors in the experimental application conform to the high risk preference rule are determined as sample users of the high risk preference type, and users whose behaviors in the experimental application conform to the low risk preference rule are determined as sample users of the low risk preference type. For example, a "balloon blowing" game is developed, in which a task of a user is to blow a balloon continuously and obtain an amount of money proportional to the size of the blown balloon. Like a balloon in real life, the balloon will explode if the user blows the balloon too big (the more the user blows, the bigger the balloon becomes). However, it is unknown at which size the balloon will explode. The user has to choose to blow one more time or exit in each round of the game. If the user chooses to blow the balloon, there are two possible results: 1) the balloon becomes bigger, and the user gets more money; and 2) the balloon explodes, and the money already obtained is cleared. If the user chooses to exit, the user can obtain money accumulated so far. In this game, users who blow the balloon for more than a quantity threshold a (specified value) may be defined as users with a high risk preference, users who blow the balloon for less than another quantity threshold b (specified value) may be defined as users with a low risk preference, and users who blow the balloon for a number of times between a and b are defined as indefinite users. There may be other types of experimental games for obtaining the samples, which are not listed one by one herein.

Step 12: Obtain a characteristic value of each sample user in the plurality of sample users under each variable in the plurality of variables. The variables herein are various pre-designed variables that are possibly correlated to the risk preference.

The characteristic value may be determined according to user data of each sample user.

Step 13: Train the risk preference model according to the characteristic value of each sample user in the plurality of sample users under each variable, and the risk preference type corresponding to each sample user, where an input of the risk preference model is the characteristic value under each variable in the plurality of variables, and an output of the risk preference model is a possibility that the user is classified into the high risk preference type. Machine learning methods used for training the model may include, but are not limited to, linear regression, logistic regression, and the like.

After the risk preference model for use is obtained through training, the characteristic value of the target user under each variable can be input into the risk preference model, so as to output the risk preference index of the target user. Risk preferences of users may be classified into multiple levels as required, for example, low, medium, and high. Moreover, the level of the risk preference of the user is determined according to the output risk preference index. For example, when the risk preference index is between 0 and 0.3, the level of the risk preference is "low"; when the risk preference index is between 0.3 and 0.6, the level of the risk preference is "medium"; when the risk preference index is between 0.6 and 1, the level of the risk preference is "high".

Figure 3:
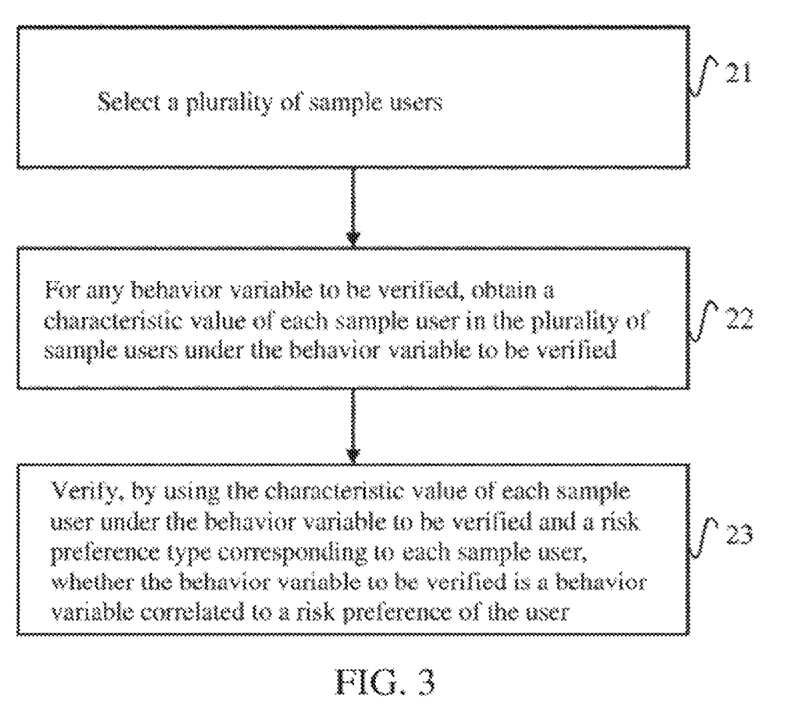
FIG. 3 illustrates a process of determining a variable correlated to a risk preference of a user according to some embodiments.

As for how to determine the variable that affects the risk preference of the user, in some embodiments, verification can be performed by using the determined sample users above. As shown in FIG. 3, the variable affecting the risk preference of the user can be determined through the following process.

Step 21: Select a plurality of sample users, the plurality of sample users including a plurality of sample users of a high risk preference type and a plurality of sample users of a low risk preference type.

Step 22: For a variable to be verified, obtain a characteristic value of each sample user in the plurality of sample users under the variable to be verified.

Step 23: Verify, by using the characteristic value of each sample user under the variable to be verified and the risk preference type corresponding to each sample user, whether the variable to be verified is the variable affecting the risk preference of the user.

In some optional embodiments, step 23 may be implemented through the following process:

Determine, based on the characteristic value of each sample user under the variable to be verified, a characteristic value rule of the plurality of sample users of the high risk preference type under the variable to be verified and a characteristic value rule of the plurality of sample users of the low risk preference type under the variable to be verified. For example, the characteristic value rule includes an average value obtained by averaging the plurality of characteristic values, or a distribution interval of the plurality of characteristic values.

If a difference between the characteristic value rule corresponding to the high risk preference type and the characteristic value rule corresponding to the low risk preference type meets a specified condition, determine the variable to be verified as the variable affecting the risk preference of the user.

For a variable affecting the risk preference, the characteristic value rules corresponding to the user samples of the "high risk preference type" and the "low risk preference type" are significantly different over the variable. On the contrary, if a variable does not affect the risk preference of the user, the characteristic value rules corresponding to the user samples of the "high risk preference type" and the "low risk preference type" are only slightly different or even the same over the variable. Therefore, a specified condition for measuring the difference can be set, to determine whether the difference between the characteristic value rules corresponding to the user samples of the "high risk preference type" and the "low risk preference type" over the variable meets the specified condition, so as to finally determine a variable meeting the condition.

For example, if the variable to be verified is "the quantity of financial products viewed by the user before an investment behavior occurs", it is assumed that characteristic values of eight user samples of the "high risk preference type", which are selected in advance, under the variable are as follows:

{3, 1, 4, 10, 5, 6, 1, 3}

It is assumed that characteristic values of eight user samples of the "low risk preference type", which are selected in advance, under the variable are as follows:

{9, 6, 7, 10, 13, 8, 8, 11}

The specified condition is that a difference between an average value x of all the characteristic values of the user samples of the "high risk preference type" under the variable and an average value y of all the characteristic values of the user samples of the "low risk preference type" under the variable is greater than 4.

Then, it is obtained through calculation that x=4.15, and y=9. Thus, the foregoing specified condition is met, and it can be determined that "the quantity of financial products viewed by the user before an investment behavior occurs" is a variable affecting the risk preference of the user.

In other optional embodiments, the foregoing step 23 may also be implemented through the following process: collecting statistics about a distribution of characteristic values greater than a specified threshold in the plurality of sample users, and determining, according to the distribution, whether the variable is a variable affecting the risk preference of the user.

For example, in the foregoing example, if the specified threshold is 5, it is obtained through statistics that the distribution of characteristic values greater than 5 is as follows: two sample users of the "high risk preference type" and eight sample users of the "low risk preference type". It can be learned that the distribution of the characteristic values corresponding to the variable on the two types of sample users is non-uniform, which indicates that the variable has a great influence on the risk preference of the user, and can be determined as a variable affecting the risk preference of the user.

In other optional embodiments, one or more variables affecting the risk preference of the user may be designed according to personal experience.

It can be learned from the foregoing technical solution that, user data of a user is obtained, a characteristic value of the user under each variable in a plurality of variables is determined according to the user data, and then a risk preference index of the user is determined by using a preset risk preference model, so as to measure a risk preference of the user according to the risk preference index. Through the foregoing process, highly accurate results can be obtained at a high efficiency. In addition, in the embodiments of this specification, user data generated most recently can be obtained according to continuous updating of user data, and the risk preference index of the user can be calculated according to the latest data, thereby ensuring stronger real-time performance of the data. The variables used in the risk preference model in the embodiments of this specification may be objective facts, and may be used for measuring actual behaviors of the user. Thus, the chance for fraud is significantly lowered.

An example of application scenarios of the foregoing method is recommending suitable financial product information according to the risk preference index of the user. Correspondingly, the embodiments of this specification further provide an information recommendation method, including: obtaining user data generated during a risk-related transaction of a user; determining a characteristic value of the user under each variable in a plurality of variables according to the user data, the variables affecting a risk preference of the user; determining a risk preference index of the user according to the characteristic value, the risk preference index being used for measuring a level of the risk preference of the user; and recommending, according to the risk preference index of the user, financing product information matching the risk preference index to the user.

The method for determining risk preference may also be applied in other scenarios, which are not listed herein.

Figure 4:
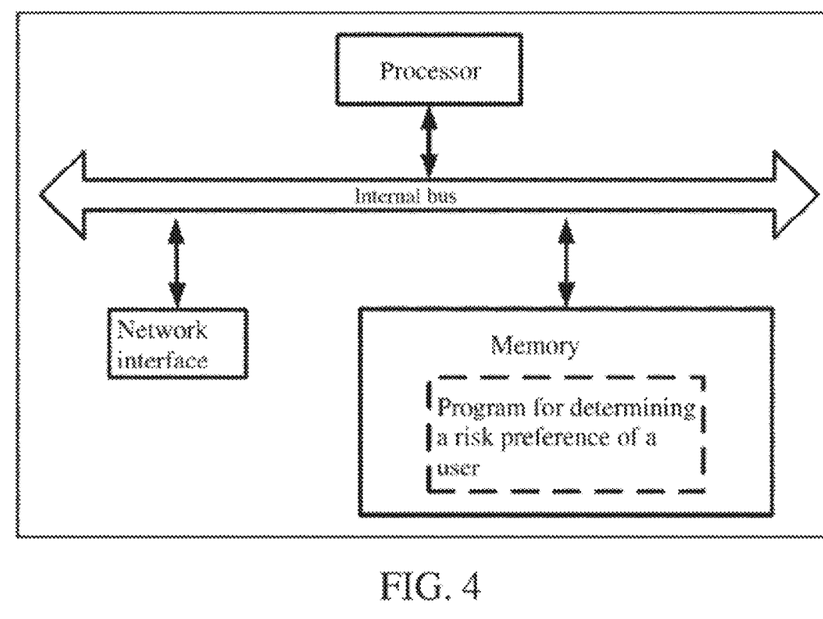
FIG. 4 illustrates a hardware structure of an electronic device according to some embodiments.

FIG. 4 shows a structure of an electronic device according to some embodiments. As shown in FIG. 4, the electronic device may be a computer device (such as a payment platform server or a financing platform server). The electronic device may include a processor, an internal bus, a network interface, and storage (including memory and non-volatile storage), and may further include other hardware required by transactions. The processor reads a corresponding computer program from the non-volatile storage into the memory and then runs the computer program. In some embodiments, in addition to a software implementation, this specification does not exclude other implementations, for example, a logic device or a combination of software and hardware. In other words, an entity executing the following processing procedure is not limited to the logic units, and may also be hardware or logic devices.

Figure 5:
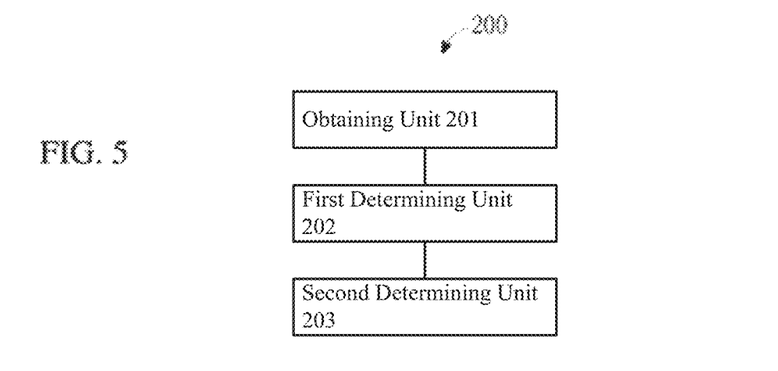
FIG. 5 illustrates a block diagram of an apparatus for determining risk preference according to some embodiments.

As shown in FIG. 5, in some embodiments, an apparatus 200 for determining risk preference includes: an obtaining unit 201, configured to obtain user data generated during a risk-related transaction of a user; a first determining unit 202, configured to determine a characteristic value of the user under each variable in a plurality of variables according to the user data, the variables affecting a risk preference of the user; and a second determining unit 203, configured to a risk preference index of the user according to the characteristic value, the risk preference index being used for measuring a level of the risk preference of the user.

Optionally, the second determining unit 203 is configured to input the characteristic value of the user under each variable into a risk preference model, and determine an output of the risk preference model as the risk preference index of the user.

Figure 6:
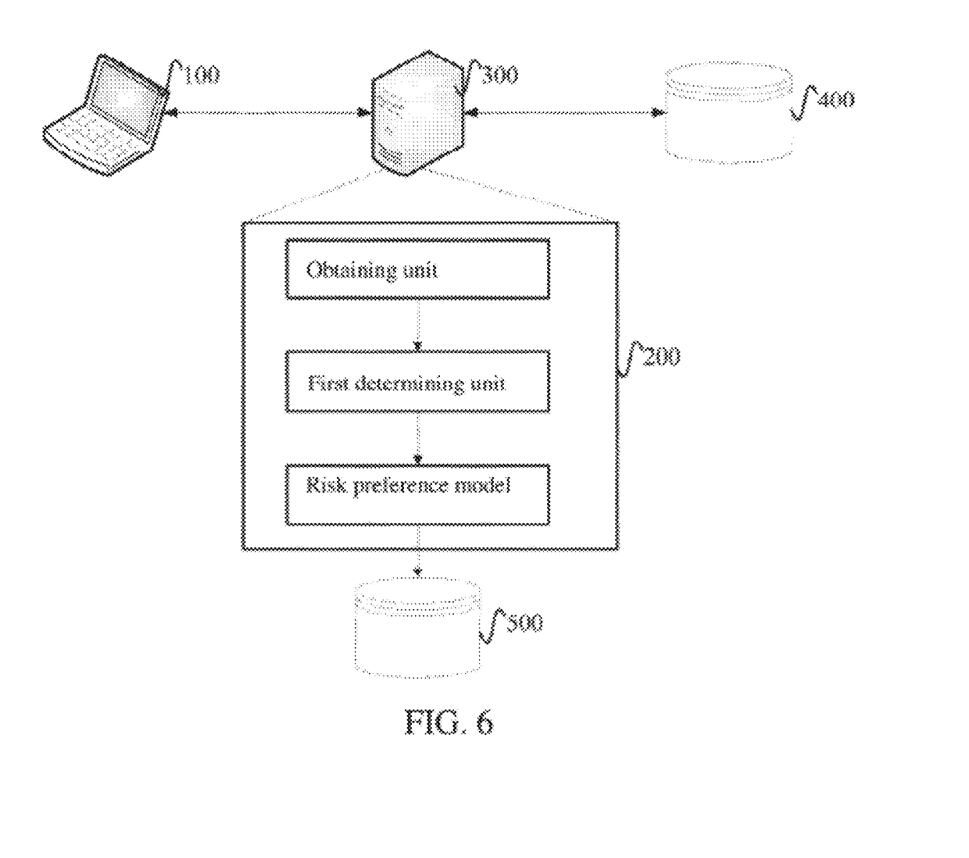
FIG. 6 illustrates a system architecture according to some embodiments.

As shown in FIG. 6, in some embodiments, a system in an example of scenarios may include: a user equipment 100, a server 300 interacting with the user equipment, a first database 400 connected to the server 300, an apparatus 200 for determining a risk preference of a user, and a second database 500. An APP providing an investment and financing transaction may be installed on the user equipment 100. The server 300 is a platform server end corresponding to the APP. The platform server end stores, in the first database 400, user data that is generated when a user participates in a risk-related transaction, so that the user data can be obtained by the apparatus 200 for determining a risk preference of a user. The apparatus 200 may be a virtual apparatus on the server 300 in the form of program code. The apparatus 200 may also be provided on another computer apparatus. When a risk preference of a user needs to be determined, the apparatus 200 obtains required user data from the first database 400, extracts characteristic values of variables, and inputs the characteristic values into a risk preference model provided in advance, so that the risk preference index of the user is output and stored in the second database 500, so that the risk preference indices can be called in various application scenarios. The first database 400 and the second database 500 may also be the same database, which is not limited herein.

Optionally, the apparatus 200 further includes: a sample selecting unit, configured to select a plurality of sample users, the plurality of sample users including a plurality of sample users of a high risk preference type and a plurality of sample users of a low risk preference type; a first obtaining unit, configured to obtain a characteristic value of each sample user in the plurality of sample users under each variable in the plurality of variables; and a training unit, configured to train the risk preference model according to the characteristic value of each sample user in the plurality of sample users under each variable and the risk preference type corresponding to each sample user, an input of the risk preference model being the characteristic value under the each variable in the plurality of variables, and the output of the risk preference model being a possibility that the user is classified into the high risk preference type.

Optionally, the apparatus 200 further includes: a second obtaining unit, configured to: for any variable to be verified, obtain a characteristic value of each sample user in the plurality of sample users under the variable to be verified; and a verification unit, configured to determine, by using the characteristic value under the variable to be verified and the risk preference type corresponding to each sample user, whether the variable to be verified is the variable affecting the risk preference of the user.

Optionally, the verification unit includes: a rule determining unit, configured to determine, based on the obtained characteristic values, a first characteristic value rule corresponding to the plurality of sample users of the high risk preference type and a second characteristic value rule corresponding to the plurality of sample users of the low risk preference type; difference determining unit, configured to determine a difference between the first characteristic value rule and the second characteristic value rule; and a correlated variable determining unit, configured to determine that the variable to be verified is the variable affecting the risk preference of the user if the difference conforms to a rule.

Optionally, the sample selecting unit may select samples in at least one of the following two manners: 1) based on a high risk preference rule and a low risk preference rule that are defined, determining users whose user data conforms to the high risk preference rule as sample users of the high risk preference type, and determining users whose user data conforms to the low risk preference rule as sample users of the low risk preference type; and 2) based on an experimental application for testing risk preferences of users as well as a high risk preference rule and a low risk preference rule that are defined, determining users whose behaviors in the experimental application conform to the high risk preference rule as sample users of the high risk preference type, and determining users whose behaviors in the experimental application conform to the low risk preference rule as sample users of the low risk preference type.

Optionally, the risk-related transaction may be an Internet financing transaction.

In some embodiments, an information recommendation apparatus based on the foregoing apparatus 200 for determining risk preference is further provided, including: an obtaining unit, configured to obtain user data generated during a risk-related transaction of a user; a first determining unit, configured to determine a characteristic value of the user under each variable in a plurality of variables according to the user data, the variables affecting a risk preference of the user; a second determining unit, configured to determine a risk preference index of the user according to the characteristic value, the risk preference index being used for measuring a level of the risk preference of the user; and a recommendation unit, configured to recommend, according to the risk preference index of the target user, financing product information matching the risk preference index to the target user.

In some embodiments of this specification, a computer device is further provided, including: a processor; and a memory configured to store instructions executable by the processor; where the processor, when executing the instructions, is configured to: obtain user data generated during a risk-related transaction of a user; determine a characteristic value of the user under each variable in a plurality of variables according to the user data, the variables affecting a risk preference of the user; and determining a risk preference index of the user according to the characteristic value, the risk preference index being used for measuring a level of the risk preference of the user.

In some embodiments of this specification, a computer storage medium with an executable program stored thereon is further provided, and the program is executed to implement the following steps: obtaining user data generated during a risk-related transaction of a user; determining a characteristic value of the user under each variable in a plurality of variables according to the user data, the variables including at least one variable affecting a risk preference of the user; and inputting the characteristic value of the user under each variable into a risk preference model to determine an output of the risk preference model as a risk preference index indicating a level of the risk preference of the user.

The embodiments of the present disclosure are all described in a progressive manner. For the same or similar parts in the embodiments, reference may be made to these embodiments. Each embodiment focuses on a difference from other embodiments. In some embodiments, a computer device embodiment, an apparatus embodiment, or a computer storage medium embodiment is basically similar to a method embodiment, and therefore is described briefly; for related parts, reference may be made to partial descriptions in the method embodiment.

In some embodiments, the various modules and units of the apparatus 200 may be implemented as software instructions or a combination of software and hardware. For example, the apparatus 200 (or referred to as a system) for determining risk preference described with reference to FIG. 5 and FIG. 6 may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules and units described above (e.g., with reference to the method embodiments). In some embodiments, the apparatus for determining risk preference may include a server, a mobile phone, a tablet computer, a PC, a laptop computer, another computing device, or a combination of one or more of these computing devices.

The system, the apparatus, the module, or the unit described in the foregoing embodiments can be implemented by a computer chip or an entity or implemented by a product having a certain function. A typical implementation device is a computer, and the form of the computer may be a personal computer, a laptop computer, a cellular telephone, a camera phone, a smartphone, a personal digital assistant, a media player, a navigation device, an email transceiver device, a game console, a tablet computer, a wearable device, or a combination thereof.

For ease of description, when the apparatus is described, the apparatus is divided into units according to functions, which are separately described. During implementation of this specification, the functions of the units may be implemented in the same piece of or multiple pieces of software and/or hardware.

A person skilled in the art should appreciate that the embodiments of the present specification may be provided as a method, a system, or a computer program product. Therefore, the present specification may be in a form of complete hardware embodiments, complete software embodiments, or embodiments combining software and hardware. Moreover, the present specification may use a form of a computer program product that is implemented on one or more computer-usable storage media (including but not limited to a disk memory, a CD-ROM, an optical memory, and the like) that include computer-usable program code.

The present specification is described with reference to the flowcharts and/or block diagrams of the method, the device (system), and the computer program product according to the embodiments of the present specification. Computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

The terms "include", "comprise" and any other variants thereof mean to cover the non-exclusive inclusion. Thereby, the process, method, article, or device which includes a series of elements not only includes those elements, but also includes other elements which are not clearly listed, or includes the inherent elements of the process, method, article or device. Without further limitation, the element defined by a phrase "include one . . . " does not exclude other same elements in the process, method, article or device which include the element.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

This specification can be described in the general context of computer executable instructions executed by a computer, for example, a program module. Generally, the program module includes a routine, a program, an object, a component, a data structure, and the like for executing a particular task or implementing a particular abstract data type. This specification can also be practiced in a distributed computing environment in which tasks are performed by remote processing devices that are connected through a communication network. In a distributed computing environment, the program module may be located in both local and remote computer storage media including storage devices.

The foregoing descriptions are merely embodiments of this specification and are not intended to limit this specification. For a person skilled in the art, various modifications and variations can be made to this specification. Any modification, equivalent replacement, or improvement made without departing from the spirit and principle of this specification shall fall within the scope of the claims of this specification.

What is claimed is:

1. A method, comprising:
training a risk preference model by:
selecting a plurality of sample users according to actual behavior of the plurality of sample users when facing a loss or when interacting with an experimental application for testing risk preferences, the plurality of sample users comprising a plurality of sample users of a high risk preference type and a plurality of sample users of a low risk preference type;
obtaining a characteristic value of each sample user in the plurality of sample users under each variable in a plurality of variables; and
training the risk preference model according to the obtained characteristic values and the risk preference type corresponding to each of the plurality of sample users, an input of the risk preference model being the characteristic value under the each variable in the plurality of variables, and an output of the risk preference model being a possibility that the user is classified into the high risk preference type, and
determining a risk preference index of a user by:
obtaining user data generated during a risk-related transaction of the user;
determining a characteristic value of the user under each variable in the plurality of variables according to the user data, the plurality of variables comprising at least one variable affecting a risk preference of the user;

inputting the characteristic value of the user under each variable in the plurality of variables into the risk preference model; and outputting the risk preference index indicating a level of the risk preference of the user from the risk preference model.

2. The method of claim 1, wherein the selecting a plurality of sample users comprises:

based on a high risk preference rule and a low risk preference rule, determining users whose user data conforms to the high risk preference rule as sample users of the high risk preference type, and determining users whose user data conforms to the low risk preference rule as sample users of the low risk preference type; and/or based on an experimental application for testing risk preferences of users as well as a high risk preference rule and a low risk preference rule, determining users whose behaviors in the experimental application conform to the high risk preference rule as sample users of the high risk preference type, and determining users whose behaviors in the experimental application conform to the low risk preference rule as sample users of the low risk preference type.

3. The method of claim 1, before determining the characteristic value of the user under the each variable in the plurality of variables according to the user data, further comprising determining the each variable affecting the risk preference of the user, wherein determining the each variable affecting the risk preference of the user comprises:

selecting a plurality of sample users, the plurality of sample users comprising a plurality of sample users of a high risk preference type and a plurality of sample users of a low risk preference type;

for a variable to be verified, obtaining a characteristic value of each sample user in the plurality of sample users under the variable to be verified; and determining that the variable to be verified is the variable affecting the risk preference of the user if the obtained characteristic values conform to a rule.

4. The method of claim 3, wherein the determining that the variable to be verified is the variable affecting the risk preference of the user if the obtained characteristic values conform to a rule comprises:

determining, based on the obtained characteristic values, a first characteristic value rule corresponding to the plurality of sample users of the high risk preference type and a second characteristic value rule corresponding to the plurality of sample users of the low risk preference type;

determining a difference between the first characteristic value rule and the second characteristic value rule; and determining that the variable to be verified is the variable affecting the risk preference of the user if the difference conforms to a rule.

5. The method of claim 1, wherein the risk-related transaction comprises a transaction with a capital loss risk, and/or a transaction associated with a risky event.

6. The method of claim 1, further comprising:

recommending, according to the risk preference index of the user, financing product information matching the risk preference index of the user.

7. The method of claim 1, wherein:

the risk-related transaction comprises an economic life service transaction or a financial transaction.

8. A system, comprising one or more processors and one or more non-transitory computer-readable memories coupled to the one or more processors and configured with instructions executable by the one or more processors to cause the system to perform operations comprising:

training a risk preference model by:

selecting a plurality of sample users according to actual behavior of the plurality of sample users when facing a loss or when interacting with an experimental application for testing risk preferences, the plurality of sample users comprising a plurality of sample users of a high risk preference type and a plurality of sample users of a low risk preference type;

obtaining a characteristic value of each sample user in the plurality of sample users under each variable in a plurality of variables; and training the risk preference model according to the obtained characteristic values and the risk preference type corresponding to each of the plurality of sample users, an input of the risk preference model being the characteristic value under the each variable in the plurality of variables, and an output of the risk preference model being a possibility that the user is classified into the high risk preference type, and determining a risk preference index of a user by:

obtaining user data generated during a risk-related transaction of the user;

determining a characteristic value of the user under each variable in the plurality of variables according to the user data, the plurality of variables comprising at least one variable affecting a risk preference of the user;

inputting the characteristic value of the user under each variable in the plurality of variables into the risk preference model; and outputting the risk preference index indicating a level of the risk preference of the user from the risk preference model.

9. The system of claim 8, wherein the selecting a plurality of sample users comprises:

based on a high risk preference rule and a low risk preference rule, determining users whose user data conforms to the high risk preference rule as sample users of the high risk preference type, and determining users whose user data conforms to the low risk preference rule as sample users of the low risk preference type; and/or based on an experimental application for testing risk preferences of users as well as a high risk preference rule and a low risk preference rule, determining users whose behaviors in the experimental application conform to the high risk preference rule as sample users of the high risk preference type, and determining users whose behaviors in the experimental application conform to the low risk preference rule as sample users of the low risk preference type.

10. The system of claim 8, wherein before determining the characteristic value of the user under the each variable in the plurality of variables according to the user data, the operations further comprise determining the each variable affecting the risk preference of the user, wherein determining the each variable affecting the risk preference of the user comprises:

selecting a plurality of sample users, the plurality of sample users comprising a plurality of sample users of a high risk preference type and a plurality of sample users of a low risk preference type;

for a variable to be verified, obtaining a characteristic value of each sample user in the plurality of sample users under the variable to be verified; and determining that the variable to be verified is the variable affecting the risk preference of the user if the obtained characteristic values conform to a rule.

11. The system of claim 10, wherein the determining that the variable to be verified is the variable affecting the risk preference of the user if the obtained characteristic values conform to a rule comprises:

determining, based on the obtained characteristic values, a first characteristic value rule corresponding to the plurality of sample users of the high risk preference type and a second characteristic value rule corresponding to the plurality of sample users of the low risk preference type;

determining a difference between the first characteristic value rule and the second characteristic value rule; and determining that the variable to be verified is the variable affecting the risk preference of the user if the difference conforms to a rule.

12. The system of claim 8, wherein the risk-related transaction comprises a transaction with a capital loss risk, and/or a transaction associated with a risky event.

13. The system of claim 8, further comprising:

recommending, according to the risk preference index of the user, financing product information matching the risk preference index of the user.

14. The system of claim 8, wherein:

the risk-related transaction comprises an economic life service transaction or a financial transaction.

15. A non-transitory computer-readable storage medium, the storage medium configured with instructions executable by one or more processors to cause the one or more processors to perform operations comprising:

training a risk preference model by:

selecting a plurality of sample users according to actual behavior of the users when facing a loss or when interacting with an experimental application for testing risk preferences, the plurality of sample users comprising a plurality of sample users of a high risk preference type and a plurality of sample users of a low risk preference type;

obtaining a characteristic value of each sample user in the plurality of sample users under each variable in a plurality of variables; and training the risk preference model according to the obtained characteristic values and the risk preference type corresponding to each of the plurality of sample users, an input of the risk preference model being the characteristic value under the each variable in the plurality of variables, and an output of the risk preference model being a possibility that the user is classified into the high risk preference type, and determining a risk preference index of a user by:

obtaining user data generated during a risk-related transaction of the user;

determining a characteristic value of the user under each variable in the plurality of variables according to the user data, the plurality of variables comprising at least one variable affecting a risk preference of the user;

inputting the characteristic value of the user under each variable in the plurality of variables into the risk preference model; and outputting the risk preference index indicating a level of the risk preference of the user from the risk preference model.

16. The storage medium of claim 15, wherein the selecting a plurality of sample users comprises:

based on a high risk preference rule and a low risk preference rule, determining users whose user data conforms to the high risk preference rule as sample users of the high risk preference type, and determining users whose user data conforms to the low risk preference rule as sample users of the low risk preference type; and/or based on an experimental application for testing risk preferences of users as well as a high risk preference rule and a low risk preference rule, determining users whose behaviors in the experimental application conform to the high risk preference rule as sample users of the high risk preference type, and determining users whose behaviors in the experimental application conform to the low risk preference rule as sample users of the low risk preference type.

17. The storage medium of claim 15, wherein before determining the characteristic value of the user under the each variable in the plurality of variables according to the user data, the operations further comprise determining the each variable affecting the risk preference of the user, wherein determining the each variable affecting the risk preference of the user comprises:

selecting a plurality of sample users, the plurality of sample users comprising a plurality of sample users of a high risk preference type and a plurality of sample users of a low risk preference type;

for a variable to be verified, obtaining a characteristic value of each sample user in the plurality of sample users under the variable to be verified; and determining that the variable to be verified is the variable affecting the risk preference of the user if the obtained characteristic values conform to a rule.

18. The storage medium of claim 15, further comprising:

recommending, according to the risk preference index of the user, financing product information matching the risk preference index of the user.

* * * * *